Nov. 12, 1968 R. DENES 3,409,968

METHOD OF MAKING A SLOTTED BLADE BY EXTRUDING

Filed Oct. 3, 1966

Inventor:
Robert Denes
By: Robert L. Zieg Atty.

3,409,968

METHOD OF MAKING A SLOTTED BLADE BY EXTRUDING

Robert Denes, Rockford, Ill., assignor to Borg-Warner Corporation, Chicago, Ill., a corporation of Illinois
Filed Oct. 3, 1966, Ser. No. 583,753
5 Claims. (Cl. 29—156.8)

This invention relates to torque converter blades and the like and particularly to a method of manufacturing solid metal blades for use in torque converters.

A principal object of the present invention is to manufacture inexpensively a torque converter blade constructed with a relatively narrow opening on the surface of the blade to be used for controlling boundary layer flow.

Another object is to provide a method of manufacturing a heavy duty torque converter blade with an internal cavity of substantial size for passing fluid therethrough.

Another object is to manufacture a torque converter blade with a cavity therein by initially extruding the blade section and bending the blade into a final form, and by this method to provide in the blade a cavity of predetermined size adapted to pass fluid therethrough.

The above and other objects and advantages of the invention will be more readily apparent when read in connection with the accompanying drawings in which.

Figure 1:
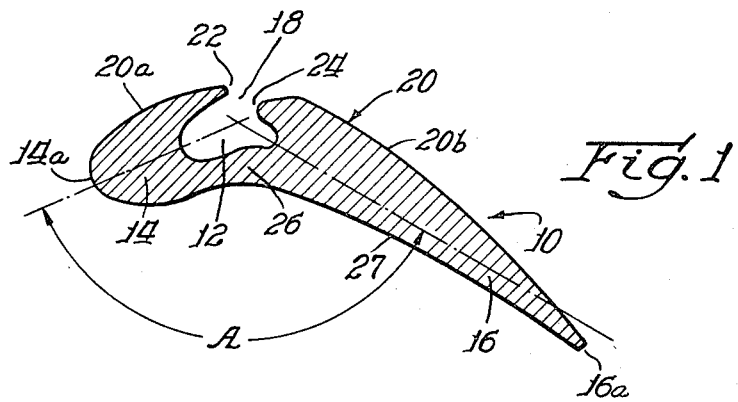
FIGURE 1 is a cross-sectional view of an extruded torque converter blade portion at the end of the first stage of the extrusion process.

Referring to the drawings in which like reference numerals designate the same parts there is shown in FIGURE 1 a torque converter blade 10 formed with slot or cavity 12 which will eventually become an internal passageway. The cavity 12 is formed in substantially the forward one-third of blade 10, i.e., more toward the leading edge 14a of leading edge portion 14 than toward the trailing edge 16a of the trailing edge portion 16 of blade 10. However, it is desirable that the cavity 12 be formed in the blade at or near the location where the boundary layer stalls. This location can be theoretically or experimentally determined for any blade shape or flow angle by those versed in the art.

The blade 10 is made of metal and preferably of aluminum. The blade 10 is to be produced by initially extruding the metal into such a form as to allow an internal cavity to be formed therein and then bending the blade into its final shape.

A very important feature of this invention is the method of manufacture of this particular type of torque converter blade with a cavity formed therein for boundary layer control purposes. The blade is made by the extrusion method and the extrusion can be done through a two-stage die.

FIGURE 1 shows a cross-sectional view of the blade 10 approximately as it appears at the end of the first stage of the extrusion process. It will be observed in FIGURE 1 that the right hand or trailing edge portion of the blade 10 is disposed at a considerable angle with respect to the leading edge portion. In the extrusion process this is necessary to allow for the formation of the initial opening defining cavity 12. It is contemplated that on the initial extrusion step the angle A between the trailing edge portion and the leading edge portion will range between 110° and 150°. In the first stage of the extrusion process a large gap 18 is formed in the convex surface 20 of the blade thereby defining forward convex surface 20a and rear convex surface 20b. The gap 18 is bounded by the projections 22 and 24, on leading edge portion 14 and trailing edge portion 16 respectively. This leaves the trailing edge portion 16 in effect hinged to the leading edge portion 14 by the intermediate portion 26, which forms part of the underside 27 of the blade 10.

Figure 2:
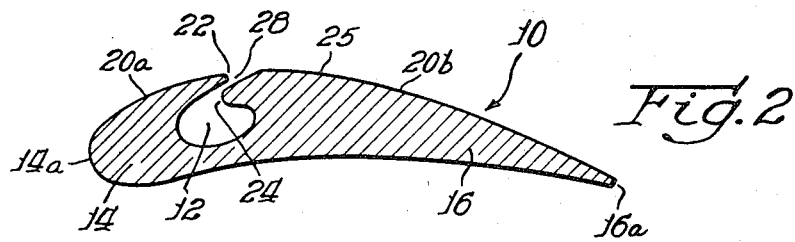
FIGURE 2 is a cross-sectional view of the final stage of an extruded torque converter blade portion.

During the second stage of the blade forming process which may be performed in a second stage extrusion die, the trailing edge portion 16 is bent with respect to the leading edge portion 14 to the position shown in FIGURE 2. The final shape is also given to the blade during the second stage extrusion process bringing the surfaces 20a and 20b in alignment with each other to define the final convex surface 25 interrupted only by a passageway 28 communicating with cavity 12. In the embodiment of FIGURE 2 the projections 22 and 24 define the passage 28 intersecting the convex surface 25 and extending inwardly to communicate with the cavity 12. In the embodiment of FIGURE 1 the passage 28 makes a small acute angle with the surface 25. With this type of construction it is contemplated that a passageway 12 can be formed in a torque converter blade from which passageway fluid under pressure can be discharged through the passage 28 into the stalling boundary layer along the rear convex surface 20b of the surface 25.

Figure 3:
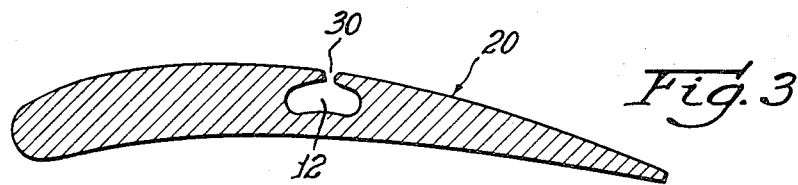
FIGURE 3 is a cross-sectional view of a torque converter blade showing a configuration particularly adapted to boundary layer control by suction.

An alternative blade construction is shown in FIGURE 3 wherein the port 30 connecting the internal passage 12 with the convex surface 20 of the blade is disposed to intersect the surface at substantially a right angle. This type of porting arrangement is more suitable for boundary layer control by the suction method.

It will be appreciated, however, that a variety of types of porting arrangements can be made using the method of blade construction heretofore described.

Figure 4:
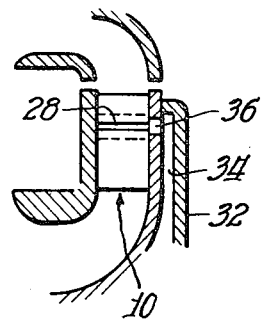
FIGURE 4 is a partial view in section showing a blade mounted in a portion of a converter unit.

In FIGURE 4 an arrangement is shown incorporating the torque converter blade of the present invention. A section of the blade 10 is shown connected to the double walled shell 32 in which is formed a passage 34 which communicates with cavity 12 through a series of ports 36. The charging pressure from the double walled shell is discharged through the passage 34 into cavity 12 of the blade 10 and out through passage 28 into the converter circuit.

The method of construction described herein has the advantage of eliminating certain tooling costs which would otherwise be involved in forming a cavity in the torque converter blade. Furthermore, this extrusion method makes it possible to form a cavity of almost any size and shape whereas it would be extremely difficult with tools such as milling cutters, for example, to form a cavity as desired.

While a preferred embodiment of the invention has been specifically disclosed, it is understood that the invention is not limited thereto as other variations will be apparent to those skilled in the art and the invention is to be given its fullest possible interpretation within the terms of the following claims.

I claim:

1. A method of producing a torque converter blade with an internal cavity therein comprising:
    extruding a blade blank having two end portions each having convex surfaces and a relatively thin portion connecting said two end portions to define a large slot between said two end portions,
    bending said blank at said thin portion to bring said end portions into a closely spaced relationship with each other so as to define an internal cavity in said blade with a passageway leading from said cavity to the outside surface of said blade.

2. The method of claim 1 wherein said blank is extruded so that said end portions define respectively a leading edge portion and a trailing edge portion of said blade and at least one of said end portions is formed with projection means thereon disposed on the opposite side of said blade blank from said thin connecting portion, so that said bending operation brings said projection means into closely spaced relationship with said other end portion to define said passageway leading from said cavity to the outside surface of said blade.

3. The method of claim 2 wherein said projection means formed on said blade blank during the extrusion thereof defines with said other end portion a passageway which is inclined at an acute angle with said outside surface of said blade.

4. The method of claim 2 wherein said projection means formed on said blade blank during the extrusion thereof defines with said other end portion a passageway disposed substantially at a right angle with said outside surface of said blade.

5. The method of claim 1 wherein said blank is extruded so that said end portions define respectively a leading edge portion having a first convex surface formed on one side thereof and a trailing edge portion having a second convex surface formed on one side thereof and said connecting portion connects said leading and trailing edge portions on the side of the blade blank opposite said first and second convex surfaces, leaving said leading edge portion and trailing edge portion formed at an angle of greater than approximately 20° with each other, and bending said blank at said thin connecting portion to bring said end portions into a closely spaced relationship with each other to bring said first and second convex surfaces into alignment with each other leaving internal cavity means with a narrow passageway connecting said cavity means and said convex surface means.

References Cited

UNITED STATES PATENTS

| 1,516,556 | 11/1924 | Wilkinson | 29—156.8 |
| 1,718,061 | 6/1929 | Miller | 29—156.8 |
| 2,019,329 | 10/1935 | Warren | 29—156.8 |
| 2,344,835 | 3/1944 | Stalker | 253—39.15 X |
| 2,723,445 | 11/1955 | Trautvetter | 29—156.8 |
| 2,759,663 | 8/1956 | Stalker | 253—39.15 X |
| 2,997,283 | 8/1961 | Seglem | 253—39.15 X |
| 3,011,762 | 12/1961 | Pouit | 253—39.15 |

FOREIGN PATENTS 359,349  10/1931  Great Britain.

JOHN F. CAMPBELL, *Primary Examiner.*

PAUL M. COHEN, *Assistant Examiner.*